United States Patent
Yang et al.

(10) Patent No.: US 10,521,371 B2
(45) Date of Patent: Dec. 31, 2019

(54) CACHE SYSTEM AND ASSOCIATED METHOD

(71) Applicant: EMC IP Holding Company LLC, Hopkinton, MA (US)

(72) Inventors: Lifeng Yang, Beijing (CN); Xinlei Xu, Beijing (CN); Jian Gao, Beijing (CN); Liam Li, Beijing (CN); Changyu Feng, Beijing (CN)

(73) Assignee: EMC IP Holding Company, LLC, Hopkinton, MA (US)

( * ) Notice: Subject to any disclaimer, the term of this patent is extended or adjusted under 35 U.S.C. 154(b) by 0 days.

(21) Appl. No.: 15/954,873

(22) Filed: Apr. 17, 2018

(65) Prior Publication Data

US 2018/0300268 A1 Oct. 18, 2018

(30) Foreign Application Priority Data

Apr. 17, 2017 (CN) .......................... 2017 1 0250202

(51) Int. Cl.
| | |
|---|---|
| *G06F 3/06* | (2006.01) |
| *G06F 12/0855* | (2016.01) |
| *G06F 13/16* | (2006.01) |
| *G06F 13/42* | (2006.01) |

(52) U.S. Cl.
CPC ........ *G06F 13/1689* (2013.01); *G06F 3/0611* (2013.01); *G06F 3/0659* (2013.01); *G06F 3/0673* (2013.01); *G06F 13/42* (2013.01)

(58) Field of Classification Search
None
See application file for complete search history.

(56) References Cited

U.S. PATENT DOCUMENTS

2016/0210243 A1* 7/2016 Fernando .......... G11C 11/40615
2016/0224481 A1* 8/2016 Ambroladze ....... G06F 13/1673

* cited by examiner

*Primary Examiner* — Hyun Nam
(74) *Attorney, Agent, or Firm* — BainwoodHuang

(57) ABSTRACT

Embodiments of the present disclosure provide a cache system and associated method. The cache system includes a first pipeline module including a first plurality of sequential processing phases for executing a plurality of operations. The first plurality of operations is executed in response to Input/Output (I/O) requests of a first plurality of types for the persistent storage device, and each of the first plurality of operations is a common operation for the I/O requests of at least two of the first plurality of types. The cache system also includes a control module configured to: determine a first type of a first pending processing I/O request for the persistent storage device, and in response to the first type being one of the first plurality of types, cause the first pipeline module to be executed to process the first pending processing I/O request.

17 Claims, 8 Drawing Sheets

CACHE SYSTEM AND ASSOCIATED METHOD

RELATED APPLICATIONS

This application claim priority from Chinese Patent Application Number CN201710250202.5, filed on Apr. 17, 2017 at the State Intellectual Property Office, China, titled "CACHE SYSTEM AND ASSOCIATED METHOD" the contents of which is herein incorporated by reference in its entirety.

FIELD

Embodiments of the present disclosure generally relate to the field of data storage and more specifically, to a cache system and a method therefor.

BACKGROUND

In a data storage system, a cache memory can be arranged between a client (also referred to as a host) and a persistent storage device for storing data temporarily. Such cache memory may be referred to as a cache memory of the persistent storage device. Different from a cache included in a processor (such as a central processing unit (CPU)) for facilitating instruction execution in the CPU, the cache memory for the persistent storage device aims to improve the read/write speed of the client from/to the storage device. Specifically, the cache memory receives from an Input/Output (I/O) request for the persistent storage device from a client, and temporarily stores a copy of data that is to be written into the persistent storage device in response to the request, or reads a cached copy of data in the persistent storage device to the client. If the cache memory has stored a data copy of the client or provided the cached data copy for the client, the I/O request is considered as being successfully processed. Since the access speed of the cache memory is usually higher than the persistent storage device, it significantly improves the read/write performance of the data storage system.

Various mechanisms and threads are implemented in the conventional cache memory for processing different types of I/O requests. Factors including thread context overheads, system complexity and scalability will influence the performance of the cache memory. Therefore, there is a need to further improve the cache memory to enhance the overall performance of the cache memory and the data storage system.

SUMMARY

Embodiments of the present disclosure provide an improved caching solution.

In a first aspect of the present disclosure, there is provided a cache system. The cache system includes: a first pipeline module including a first plurality of sequential processing phases for executing a first plurality of operations. The first plurality of operations is executed in response to Input/Output (I/O) requests of a first plurality of types for the persistent storage device, and each of the first plurality of operations is a common operation for the I/O requests of at least two of the first plurality of types. The cache system also includes a control module configured to determine a first type of a first pending processing I/O request for the persistent storage device, and in response to the first type being one of the first plurality of types, cause the first pipeline module to be executed to process the first pending processing I/O request.

In a second aspect of the present disclosure, there is provided a method for a cache system associated with the persistent storage device. The method includes receiving a first pending processing Input/Output (I/O) request for the persistent storage device. The cache system includes a first pipeline module having a first plurality of sequential processing phases for executing a first plurality of operations. The first plurality of operations is executed in response to I/O requests of a first plurality of types for the persistent storage device, and each of the first plurality of operations is a common operation for the I/O requests of at least two of the first plurality of types. The method also includes determining a first type of a first pending processing I/O request. The method further includes in response to the first type being one of the first plurality of types, causing the first pipeline module to be executed to process the first pending processing I/O request.

In a third aspect of the present disclosure, there is provided a computer-readable medium having computer readable instructions stored thereon, the computer readable instructions, when being executed, causing a device to perform the method according to the second aspect.

The Summary is provided to introduce selections of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The objectives, advantages and other features of the present disclosure will become more apparent through the detailed description of example embodiments of the present disclosure with reference to the accompanying drawings, where the same reference symbols generally refers to the like elements in the example embodiments of the present disclosure.

DETAILED DESCRIPTION OF EMBODIMENTS

Figure 1:
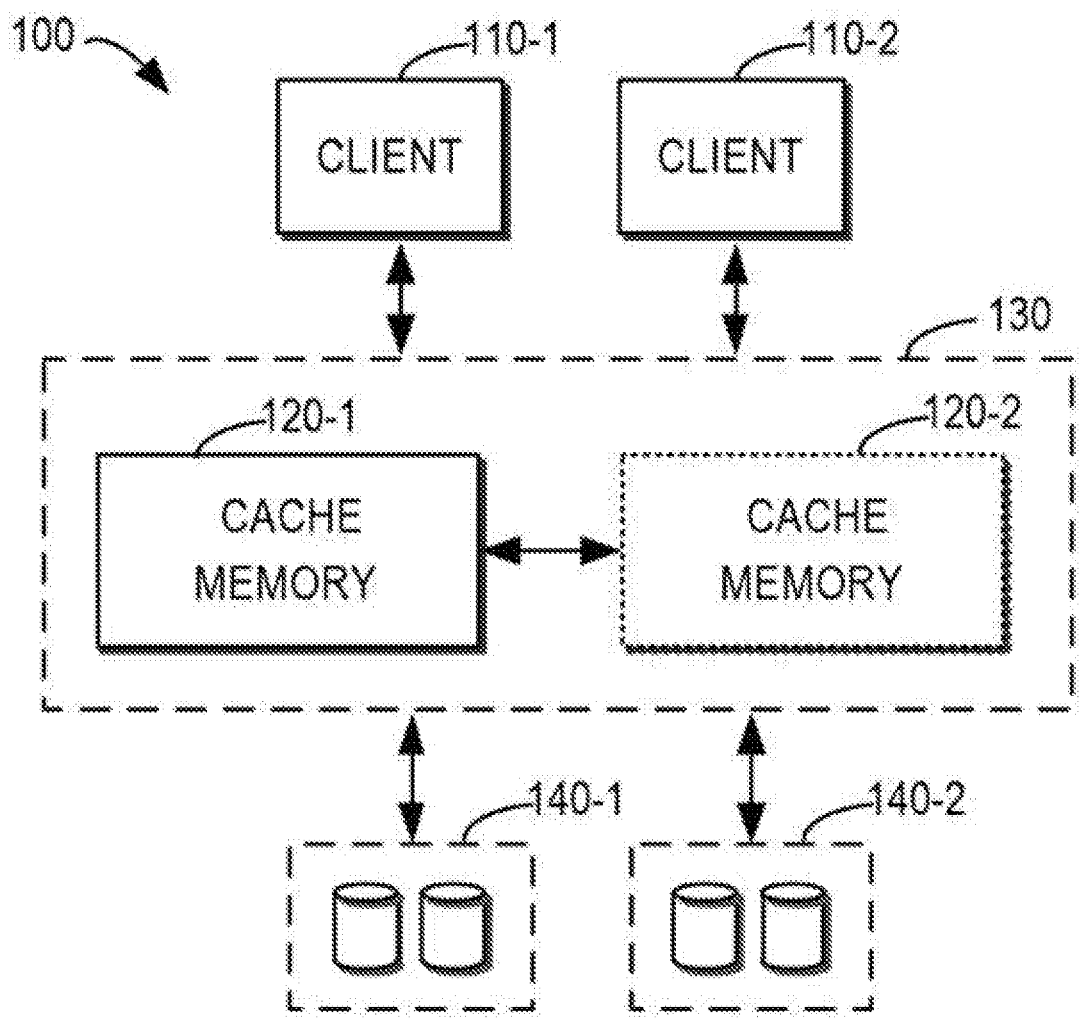
FIG. 1 illustrates a schematic diagram of a scenario of data storage in which embodiments of the present disclosure can be implemented.

Principles of the present disclosure will now be described with reference to several example embodiments illustrated in the drawings. Although some preferred embodiments of the present disclosure are shown in the drawings, it would be appreciated that description of those embodiments is merely for the purpose of enabling those skilled in the art to better understand and further implement the present disclosure and is not intended for limiting the scope disclosed herein in any manner.

As mentioned above, in a scenario of data storage, one or more cache systems can be provided between a client and a persistent storage device to improve the read/write speed of the client from/to the storage device, especially from/to the persistent storage device. The cache system can cache copies of data that will be written into/read from the persistent storage device by the client. Since the read/write access from/to the persistent storage device by the client is a continuous process, the read/write process may read and/or write some data repeatedly; thus caching copies of the data in a cache system with a higher access speed will be beneficial to accelerate the read/write access speed.

FIG. 1 illustrates a schematic diagram of a data storage scenario 100 in which embodiments of the present disclosure can be implemented. As shown, each of a plurality of clients 110-1 and 110-2 (hereinafter collectively or individually referred to as clients 110) can access one or more of persistent storage devices 140-1 and 140-2 (hereinafter collectively or individually referred to as persistent storage devices 140) for reading and writing, so as to read data from or write data into the persistent storage device 140. The persistent storage device 140 can store the data in a persistent and non-volatile way and will not lose the stored data upon shutdown. Examples of the persistent storage device 140 may include, but are not limited to, a Digital Versatile Disk (DVD), Blue-ray Disk (BD), Compact Disk (CD), floppy disk, hard disk, tape drive, optical drive, Solid-state Storage Disk (SSD), Disk Redundant Array of Independent Disks (RAID), or other persistent storage devices. In some embodiments, the persistent storage devices 140 may form a storage system specific to the client 110.

A client 110 may request a read/write access to a persistent storage device 140 via an Input/Output (I/O) request. The I/O request may be first processed by a cache section 130 provided between the client 110 and the persistent storage device 140. The cache section 130 includes a cache memory 120-1, which has a storage space for caching partial data of the persistent storage device 140. The cache memory 120-1 may be any storage device or readable medium having a capability of caching. In some embodiments, the cache memory 120-1 may be a multi-core cache memory for further enhancing the access speed.

After receiving the I/O request, if the I/O request is related to writing data into the persistent storage device 140, the cache memory 120-1 may first cache the data and send a response of successful writing to the client 110. The cache memory 120-1 then writes the cached data into the persistent storage device 140 after a period of time. If the I/O request is related to reading data from the persistent storage device 140, the cache memory 120-1 may first check whether the data to be read is cached or not. If the data is cached, the cache memory 120-1 directly provides the required data for the client 110 without accessing the persistent storage device 140. If the data is not cached, the cache memory 120-1 may read data from the persistent storage device 140, provide the data for the client device 110, and cache the data for subsequent read. The persistent storage device 140 can also be referred to as a backend storage device for the cache memory 120-1.

The arrangement of a cache memory between a read/write client and a persistent storage device can enhance overall performance of the data storage system, which can achieve advantages including at least the following:

First, as the response speed of the cache memory is usually higher than the persistent storage device, it can significantly reduce the read/write speed of the client device. For example, in an operation of writing data, the client device can confirm more quickly whether the data is successfully written or not; in an operation of reading data, the data is more quickly retrieved from the cache memory without accessing the persistent storage device.

Second, the cache memory is also able to predict which data is probably read by the client device subsequently, and then read and cache the data from the persistent storage device before the data is requested by the client device. This is very beneficial for sequential reading or writing by the client device for example.

Third, the cache memory can provide transactional reads and writes with a property of atomicity, consistency, isolation and durability (ACID) for the client. For example, in some cases, the cache section 130 may also include a further cache memory 120-2 opposite to the cache memory 120-1 in the example of FIG. 1. The cache memory 120-2 can store a mirror of the data cached by the cache memory 120-1, which can ensure redundancy of the cached data and provide durability. The cache memories 120-1 and 120-2 are interconnected to each other through various interfaces such as a Peripheral Component Interconnect Express (PCIe). The cache memories 120-1 and 120-2 can be the same or similar cache devices and can be collectively referred to as cache memories 120 herein.

Further, the cache memory can also decrease the amount of I/O accesses to the persistent storage device. For example, the cache memory can merge the data written by the client via a plurality of I/O requests and then write the merged data into the persistent storage device. The cache memory may also reduce the number of constantly reading the same data from the persistent storage device by directly providing the cached data for the client. In addition, the cache memory may also write the persistent storage device in a Logical Block Addressing (LBA) order, so as to increase the throughput of the persistent storage device.

It would be appreciated that the cache memory discussed herein is provided between the client and the persistent storage device, which is different from the cache included in a processor. In general, the cache in the processor is referred to as a level 1 cache for accelerating instruction execution of the processor and information transmission between the processor and the internal memory. The cache memory associated with the persistent storage device can be referred to as a level 2 cache for improving read/write access from/to the persistent storage device by the client.

It would be appreciated that FIG. 1 is illustrated only as an example of the scenario of data storage. The clients 110 can be independent terminal devices or servers having the capability of reading and writing data and the cache section 130 and/or the persistent storage devices 140 can be external peripheral devices to the clients 110. One or more clients 110 can implement data read/write access through the cache section 130 and/or the persistent storage device 140. In some further embodiments, the scenario of data storage 100 can form a single general-purpose computing system and the clients 110 can be components having the capability of data read/write access within the computing system. It would also be appreciated that the scenario arrangement shown in FIG. 1 is only an example. In some other scenarios, there are more or less entities. For example, there are more or less clients and more or less persistent storage devices.

Figure 2:
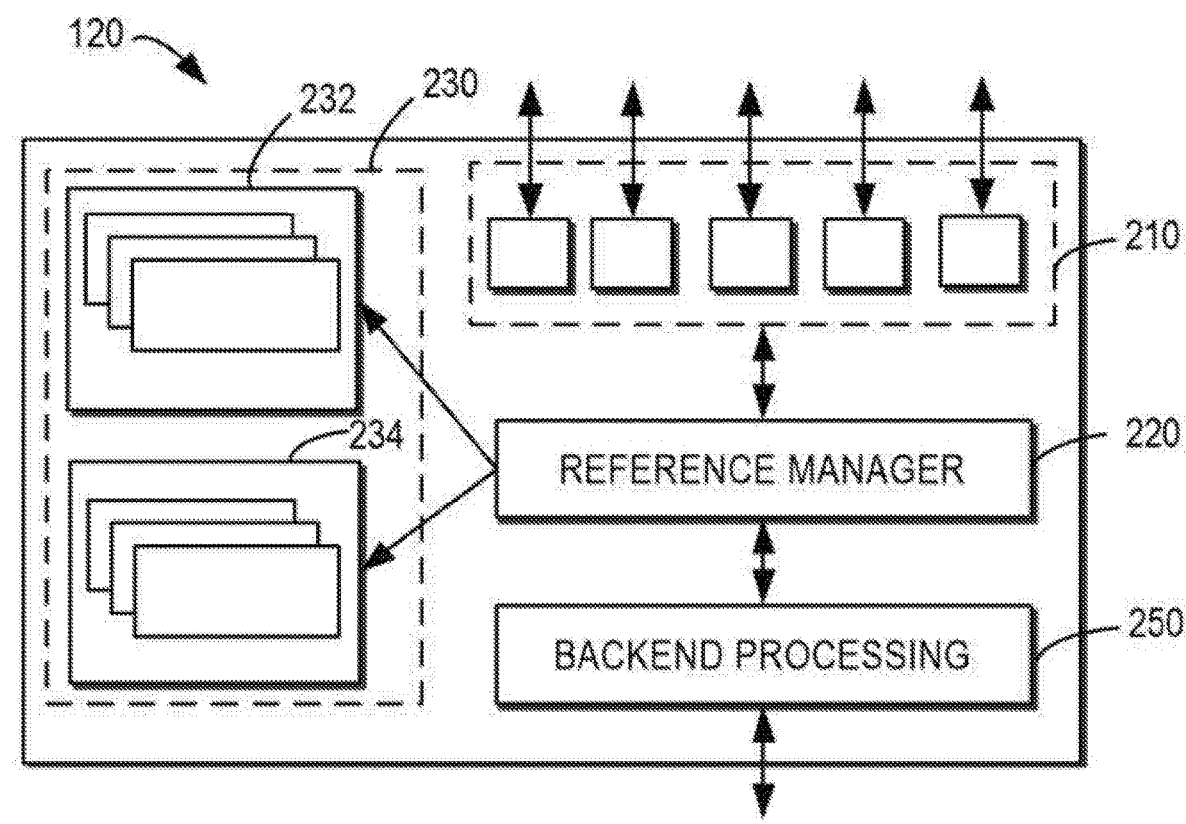
FIG. 2 illustrates a structural block diagram of a conventional cache system.

To implement caching, the conventional cache memory is provided with components, such as various threads and program modules therein for processing the I/O requests, managing local cache and accessing the backend storage devices. These operational processes will have impacts on the performance of the cache memory. FIG. 2 illustrates a block diagram of example components in a conventional cache memory 120. The cache memory 120 includes an actor section 210 including a series of operations for processing various types of I/O requests. For example, the section 210 can include an actor for read requests, an actor for write requests, an actor for zero-fill requests, an actor for pre-fetch requests, an actor for data removal, and the like. Each actor has a plurality of states and waits for receiving and processing corresponding types of I/O requests. Each actor can be executed in a respective thread.

When processing a corresponding I/O request, an actor 210 may need to utilize and access cache resources 230 to complete the processing. The cache resources 230 of the cache memory 120 are managed by a reference manager 220. The cache space of the cache memory 120 may be divided into a set of cache blocks 232 for storing the data to be accessed by a client. The cache blocks 232 may also be referred to as cache pages 232. For convenience of management, there are also provided a set of cache references 234 corresponding to the set of cache pages 232 in some cache solutions. Each cache reference 234 is a basic management unit for a cache page 232 to record states of the data in the cache page 232, whether the data is accessed, whether the data is modified or not, and the like. The cache pages 232 and the cache references 234 are limited, both of which may be referred to as cache resources 230.

The cache memory 120 also includes backend processing 250 for performing read/write access from/to the backend persistent storage device 140. As mentioned above, for a write operation from the client 110, the cache memory 120 not only caches the data to be written and provides a response to the I/O request for the client 110, but also stores the cached data (in some cases, data merged from a plurality of I/O requests) in the persistent storage device 140 after a period of time. For a read operation, if the cache memory 120 does not cache the corresponding data, respective data would be read from the persistent storage device 140 for caching. The read/write access from/to the backend persistent storage device 140 will be performed via a backend I/O request issued by the cache memory 120. This will be implemented by the backend processing 250.

In the conventional cache memory architecture, since different actors 210, reference manager 220 and backend processing 250 perform corresponding functions in different threads, excessive thread context switches might occur, which are time-consuming. A thread context switch will be extremely time-consuming especially when the local end processing (also referred to as frontend processing) of the cache memory responsive to an I/O request is completely irrelevant to the backend processing of accessing the persistent storage device. Moreover, different types of I/O requests will be scheduled to different actors 210 for processing, which will increase the system complexity and difficulty in maintenance, and also reduces the system scalability and performance enhancement capability. For example, if there are a large number of I/O requests of a certain type received from the client during a given time, the corresponding actor 210 cannot process the requests quickly, which significantly lowers the access speed. If the cache memory 120 is expected to process a new type of I/O requests, a new actor is required to be added for dedicated processing.

To solve the above problem and at least some of the other potential problems, the embodiments of the present disclosure provide a solution for a cache system. According to the solution of the embodiments of the present disclosure, a pipeline module is introduced between a client and a persistent storage device in the cache system. The pipeline module includes a plurality of sequential processing phases respectively for executing a plurality of operations. These operations are executed in response to I/O requests of a plurality of types, and each operation is a common operation for IO requests of at least two of the plurality of types of I/O requests. Accordingly, the pipeline module can process various types of I/O requests in a pipeline manner, such that the cache system can process the incoming I/O requests at a higher speed, thereby significantly improving performance of the cache system.

Figure 3:
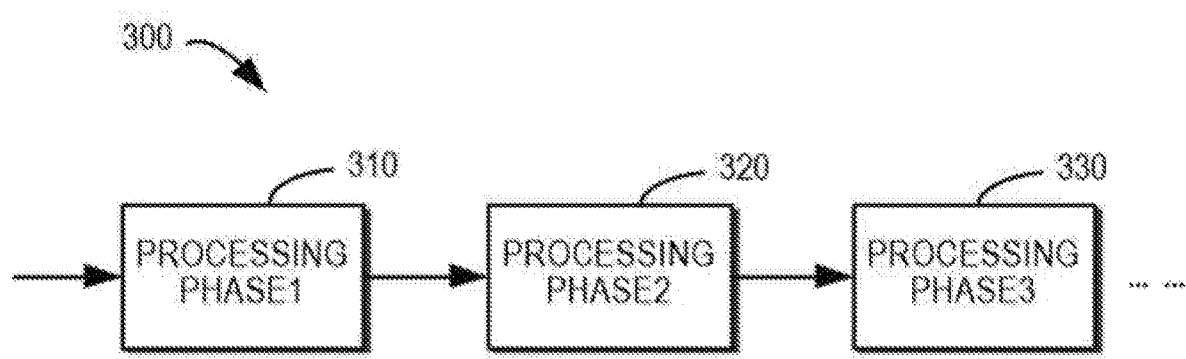
FIG. 3 illustrates a schematic diagram of a conventional pipeline module.

Before detailed discussion of the solution of the present disclosure, some concepts of pipeline processing are introduced. In the computer field, a pipeline is a group of processing phases connected in sequence, where the output of a previous processing phase is the input of a next processing phase. Some or all processing units in the pipeline are often executed in parallel or in a time-division fashion. FIG. 3 illustrates a schematic diagram of a processing pipeline 300. The pipeline 300 includes a plurality of processing phases 1, 2, 3, . . . , respectively marked as 310, 320, 330, . . . . In the pipeline 300, the output of the processing phase 310 is the input of the processing phase 320, and the output of the processing phase 320 is the input of the next processing phase 330, and the like.

The pipeline processing usually divides a big processing task into a plurality of basic small processing phases, each executing one operation of the task. At present, the pipeline processing is applied in a processor of a computing device for facilitating instruction execution in the processor. For example, the processor may split a basic instruction cycle into a series of processing phases (i.e., a pipeline). Instead of initiating execution of a next instruction in sequence after finishing an instruction, the processor can initiate execution of a plurality of instructions concurrently. For example, when an operation of a first instruction is being executed by a second processing phase of the pipeline, the corresponding operation of a second instruction can be started by a first processing phase of the pipeline. By fragmenting the operations in instruction execution, it is possible to maximize the usage of processing resources of the processor. One object of the pipeline is to make each part of the processor to process the instructions continuously, which can effectively increase the throughput of the processor.

In the embodiments of the present disclosure, the read/write access from/to a persistent storage device by a cache memory is improved in view of the concept of pipeline. Example implementations of the present disclosure will be discussed in details below.

Figure 4:
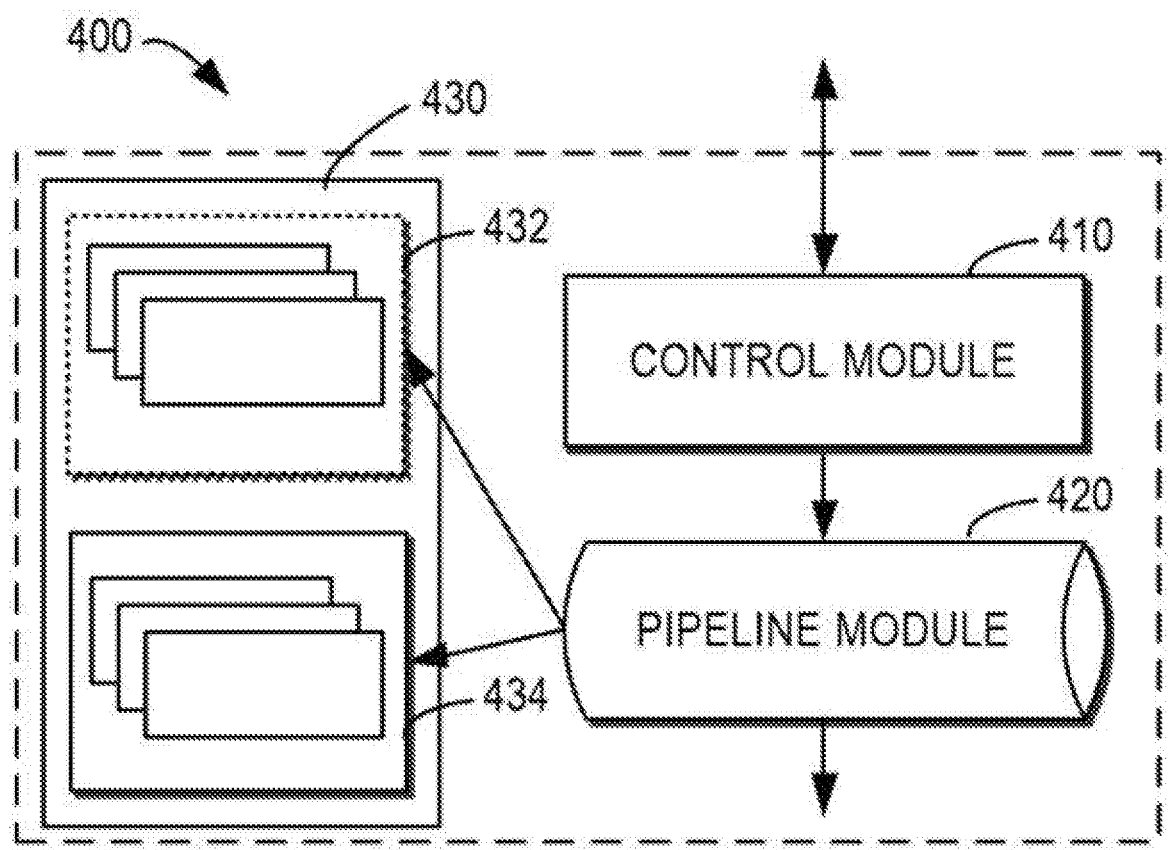
FIG. 4 illustrates a structural block diagram of a cache system in accordance with an embodiment of the present disclosure.

FIG. 4 illustrates a structural block diagram of a cache system 400 in accordance with an embodiment of the present disclosure. The cache system 400 can be implemented at the cache memory 120 shown in FIG. 1. The cache system 400 can be associated with one or more persistent storage devices or systems (not shown) so as to accelerate the read/write access from/to the associated persistent storage devices by the client. Such persistent storage devices can be for example the persistent storage device 140 shown in FIG. 1. The cache system 400 can cache a copy of partial data that has been stored in or is to be written in the persistent storage device 140.

As shown in FIG. 4, the cache system 400 includes a control module 410, a pipeline module 420, and cache resources 430. The pipeline module 420 includes a plurality of sequential processing phases for executing a plurality of operations, where each of the sequential processing can execute one of the plurality of operations. These operations are executed by the cache system 400 in response to I/O requests of a plurality of types for the persistent storage device. In a pipeline, the processing phases are arranged in sequence, so that the output of a previous processing phase can be used as the input of a next processing phase for subsequent processing.

In some embodiments, the I/O requests for creating the pipeline module 420 may be received from a persistent storage device that can access and is associated with the cache system 400. The types of the I/O requests may include more than one of the following requests: a read request, a write request, a zero-fill request, a pre-fetch request, and a data removal request. The read request is directed to reading data stored in the persistent storage device by a client, and thus may include an access address (a physical address and/or a logical address) of the data to be read as well as other information. The write request is directed to writing data into the persistent storage device by a client and thus may include the data to be written and, in some cases, an address (a physical address and/or a logical address) to which the data is written. The zero-fill request refers to writing all-zero information into a partial storage space of the persistent storage device, which may also be regarded as a write operation.

The pre-fetch request requires that the cache system 400 can predict and extract the cached data from the associated persistent storage device, so as to facilitate the client to acquire the cached data quickly and directly from the cache system 400, which may also be regarded as a read operation. Such pre-fetch request may occur for example when the client is performing a sequential read. Of course, the pre-fetch request may also occur in some other application situations. In addition, the cache system 400 may also receive a data removal request for removing the data in the persistent storage device. A series of read/write operations are needed to complete the data removal request. It would be appreciated that only some example types of I/O requests are provided above. In other implementations, the pipeline module may also be provided according to other types of I/O requests. Moreover, one or more types of I/O requests may also be split into two or more specific types according to their characteristics. The implementations of the present disclosure are not limited in this regard.

In the embodiments of the present disclosure, in order to create the pipeline module 420, different types of I/O requests can be analyzed and the overall processing related to these I/O requests can be divided into fine-grained operations. Then, corresponding processing phases are created to execute the respective operations. In order to process different types of I/O requests in the pipeline, if a common operation related to I/O requests of two or more types is analyzed amongst these I/O requests, a corresponding processing phase can be created for the common operation. That is, each of the operations executed by the processing phases is a common operation for I/O requests of at least two types of the plurality of types. In some embodiments, the request executed by the pipeline module 420 can be the common operation for I/O requests of all of the plurality of types. In the cache system, although different types of I/O requests have different purposes, all of them may be related to some common operations, such as "allocating a cache request structure," "getting access to a reference," "reserving a cache page," and the like. The above common operations are examples only, and the operations can be divided according to different requirements and the particular processing process for the I/O requests in the specific cache systems. The implementations of the present disclosure are not limited in this regard.

In some embodiments, the process of operations for executing the I/O requests would be reasonably divided so as to create the processing phases of the pipeline. Various methods can be employed to split the process of operations for different I/O requests into operations of different granularities, and a corresponding processing phase is created for a common operation for I/O requests of two or more types. The sequence of the processing phases in the pipeline corresponds to the sequence of different operations for the I/O requests. In some embodiments, the split operations can be atomic operations and the operations are not correlated with one another, such that these operations can be executed in the pipeline module 420. Various processing phases and operations can be divided and created by different methods and the scope of the present disclosure is not limited in this regard.

In the cache system 400 of FIG. 4, the control module 410 may control and manage the pipeline module 420 and the cache resources 430, for example, control and manage the execution scheduling, processing phase selection, state monitoring, resource scheduling and the like, which will be discussed in details below. The cache resources 430 at least include a space 432 for caching data in the cache system 400. In some embodiments, the cache space 432 can be split into a plurality of cache blocks (also referred to as cache pages) of a specific size. In some cache structures, the cache resources 430 may also include basic management units 434 for managing the cache space or the respective cache blocks. The basic management units record states of the data of the cache page 432, whether the data is accessed or not, whether the data is modified or not, and the like. Such basic management units 434 are also referred to as cache references 434 in some cases. Each of the cache references 434 can manage one or more cache pages 432. In some implementations, the data of the cache page 432 and/or the cache reference 434 may be stored in form of hash table.

Since the cache space of the cache system 400 is limited, the cache resources 430, including the cache pages 432 and the cache references 434, are also limited. During the processing of the I/O requests, some of the cache resources 430 will be required. It would be appreciated that the above cache pages and cache references are only some examples of the cache resources. In the cache system 400, other cache resources can be arranged or designed for the purpose of data caching.

During the operation, the control module 410 can serve as a controller of the pipeline module 420 and may receive a pending processing I/O request. For example, the control module 410 may receive a pending processing I/O request from a client that is accessible to the cache system 400. The pending processing I/O request is an I/O request for the persistent storage device associated with the cache system 400, but will be processed by the cache system 400 so as to improve the response speed of the I/O request. Specifically, the control module 410 may determine the type of the pending processing I/O request, so as to determine whether the request may be executed by the pipeline module 420 that has been provided in the cache system 400. In some implementations, the control module 410 can also determine whether the I/O request is a valid I/O request (for example, whether it will access an illegal storage address, an error requested address, an error data length, or the like). The pipeline module 420 is invoked to execute the processing only when the I/O request is valid.

If the control module 410 determines that the type of the current pending processing I/O request belongs to a type of I/O requests for creating the pipeline module 420, the pipeline module 420 can be executed for processing the I/O request. In some embodiments, the control module 410 can provide the pending processing I/O request to the pipeline module 420, so as to cause each processing phase in the pipeline module 420 to be executed. The control module 410 may also transmit a trigger signal to activate the pipeline module 420 to execute the operations corresponding to the current I/O request. Each sequential processing phase in the pipeline module 420 will execute the respective operation, thereby implementing the processing of the I/O request.

Since the pipeline module 420 may contain some processing phases for the operations that are not needed for a given type of I/O requests, in some embodiments, the control module 410 may also select at least one of the processing phases for the current pending processing I/O request. The selected processing phase(s) may execute the operations that should be implemented by the cache system 400 in response to the pending processing I/O request. The control module 410 may can cause the selected processing phase(s) to be executed for the pending processing I/O request, and cause other processing phases in the pipeline module 420 to be skipped. For a skipped processing phase, the output of a previous processing phase is transparently transmitted to the phase following the skipped processing phase. That is to say, the skipped processing phase does not process the output of the previous phase. In some embodiments, if all operations executed by the processing phases in the pipeline module 420 are common for a plurality of types of I/O requests, no phases are needed to be skipped.

Generally, the selected processing phases will execute the respective operations for the I/O request in sequence. During the execution process, if a given processing phase cannot successfully complete the processing, in some implementations, the execution restarts from the first selected processing phase according to a predetermined rule, such that the I/O request can be completed successfully.

The processing of the pipeline module 420 is in a pipelined fashion, and each processing phase is available after its own operation is completed, without waiting for the overall completion of the current I/O request. Therefore, in some embodiments, if the cache system 400 receives a further pending processing I/O request (which may be referred to as a second I/O request) during the processing process of an I/O request (which may be referred to as a first I/O request), and the control module 410 determines that the type of the second pending processing I/O request is also a type of I/O requests for creating the pipeline module 420, the control module 410 may continue to cause the pipeline module 420 to execute the processing of the second I/O request in this case.

Specifically, the control module 410 determines that a given processing phase is currently executing the operation corresponding to the first I/O request in the pipeline module 420 and the given processing phase is not the first processing phase of the plurality of processing phases according to the order (i.e., there are other processing phases in front of this processing phase), then the control module 410 may cause the pipeline module 420 to be executed so as to process the second I/O request using the processing phase(s) prior to the processing phase that is currently executing the operation of the other I/O request amongst the plurality of processing phases. According to the pipeline order, the first processing phase in the one or more processing phases selected for the second I/O request will execute the corresponding operation. In this way, different operations of a plurality of I/O requests can be processed concurrently in a single pipeline, which improves the throughput of the cache system 400 for processing the I/O requests.

Since many I/O requests would be allocated with corresponding cache resources 430 for processing, the control module 410 may control the scheduling of the cache resources 430 for the processing phases, such that the processing phases are able to complete the execution. In some embodiments, as the resources of the cache resources 430 are limited, when one or more processing phases of the pipeline module are to be executed, there may not be sufficient available resources for the processing phases to use. Therefore, the processing phase cannot execute the corresponding operations. In some examples, a waiting phase may be introduced in the processing phases during the execution of the pipeline module 420. The waiting phase suspends the processing phases that have no sufficient available cache resources for a predetermined period of time. During the period of time, no operations are executed. The introduction of the waiting phase may be determined by the control module 410 or by the processing phases per se. The processing phases that perform the determination are usually the processing phases that require the scheduling of the cache resources.

Specifically, the control module 410 or a given processing phase may determine that the cache resources 430 (such as the cache references 434 and/or cache pages 432) available for the processing phase in the current cache system is below a predetermined threshold, and then the execution of the processing phase will be suspended for a predetermined period of time. The period of time may be configured. When the available cache resources are determined to exceed the predetermined threshold, the processing phase may be executed. The predetermined threshold may be configured based on the cache resources desired by the operations to be executed by the processing phase.

Figure 5A:
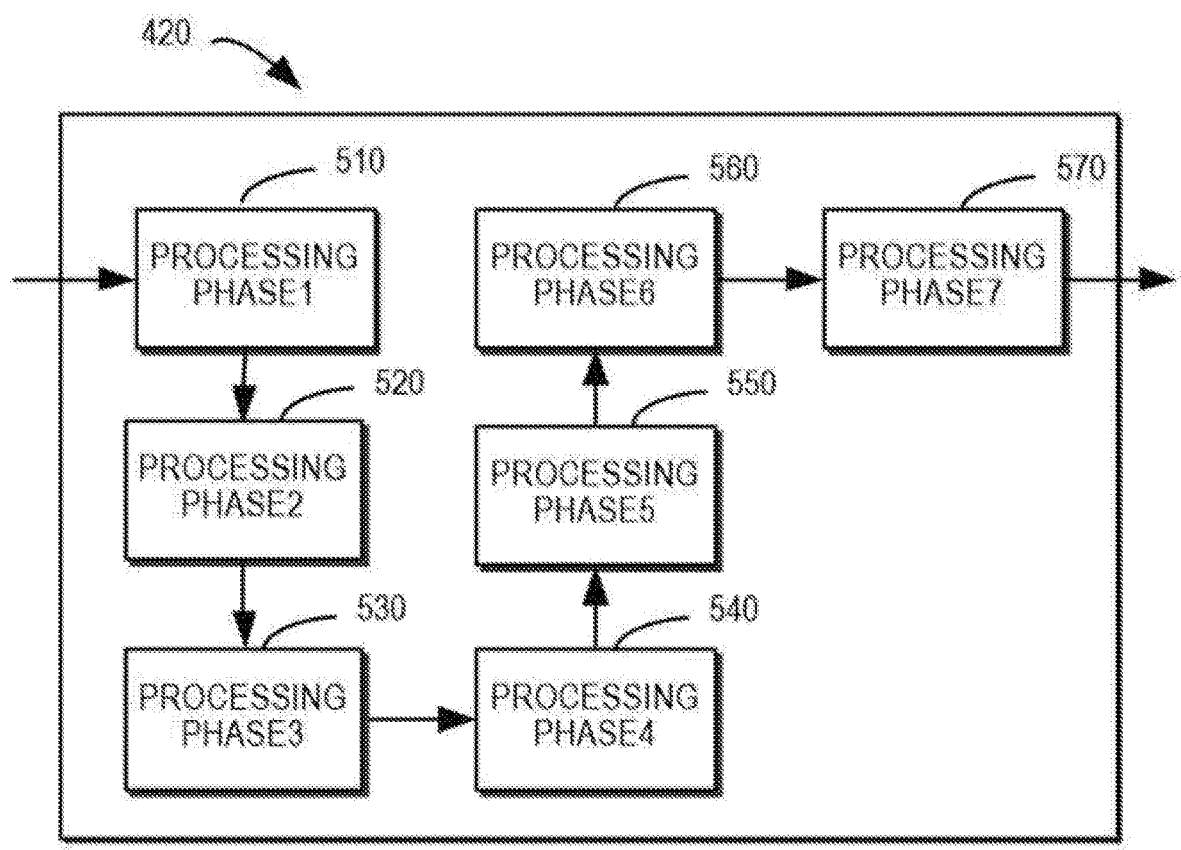
FIG. 5A illustrates a schematic diagram of a pipeline module in accordance with an embodiment of the present disclosure.
Figure 5B:
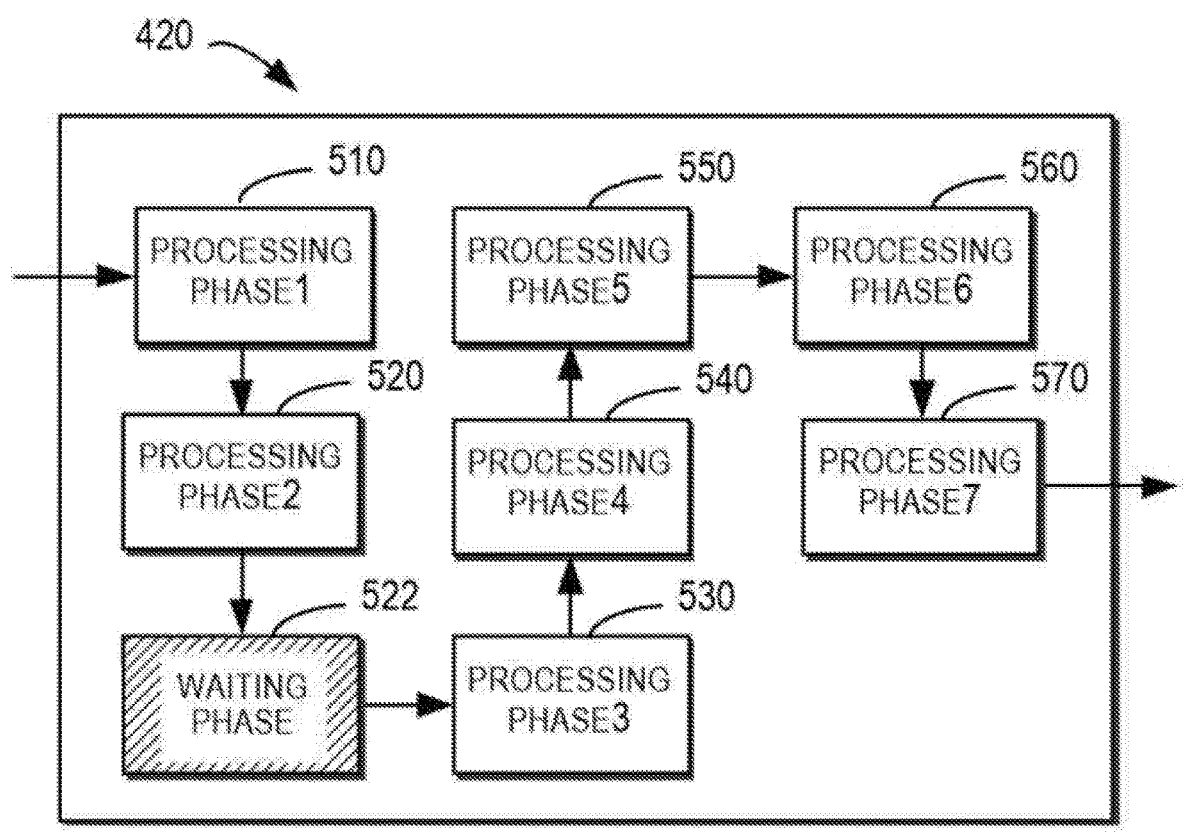
FIG. 5B illustrates a schematic diagram of adding a waiting phase in the pipeline module in accordance with an embodiment of the present disclosure.

FIG. 5A illustrates an example of processing phases in the pipeline module 420. In this example, the pipeline module 420 may include seven sequential processing phases 510 to 570. It is assumed that when the processing phase 530 is prepared for executing the operation, the available cache resources 430 are insufficient for the operation; thus, a waiting phase 522 is inserted before the processing phase 530 and after the processing phase 520, as illustrated in FIG. 5B. During the waiting phase 522, the execution of the processing phase 530 is suspended. For the processing phases after the processing phase 530, if the output of the processing phase 530 is not required for the subsequent processing (for example, if the following one or more processing phases are executing the processing of other I/O requests without needing allocation of the cache resources), the processing phases may continue the execution. It would be understood that FIGS. 5A and 5B only illustrate examples of the pipeline module 420, and in other examples, there may have more processing phases and more waiting phases can occur among the processing phases.

In some embodiments, a plurality of processing phases in the pipeline module 420 are executed in the same thread, which avoids the overheads of thread context switch caused by switching among different threads. In some embodiments, the pipeline module 420 may only include operations of the frontend processing for the I/O requests; that is, operations related to access to the associated persistent storage device are excluded. In these implementations, the cache system 400 may also include components of the backend processing (not shown) for reading data from or writing data into the persistent storage device if required. The backend processing can be completed in a further thread different than the pipeline module 420.

Alternatively, as the plurality of types of I/O requests may all be related to the access to the persistent storage device and the operations corresponding to such access often occur after the completion of the frontend operations, when creating the pipeline module 420, a corresponding processing phase can be generated for at least one operation related to the access to the persistent storage device. The generated processing phase and the process created the frontend operations are merged into one pipeline (that is, the pipeline module 420).

It has been described above the example implementations where the cache system 400 includes a single pipeline module 420. In the embodiments described above, the control module 410 performs the determination of the type of an incoming I/O request and trigger of the execution of the pipeline module. In some other embodiments, as the determination of the type of the received pending processing I/O request is always needed, this function of the control module 410 can also be created as a processing phase in the pipeline mechanism. The control module 410 also includes a function for resource scheduling, which may be considered as a resource manager.

It would be understood that in some cases, the pipeline module 420 may be created only to process common operations for some types of I/O requests. The cache system 400 may also include other components or functional modules (not shown) for executing unique operations for respective I/O requests. Although in addition to the pipeline module, other components may be required to implement some I/O requests, the use of the pipeline module can still accelerate the response speed of the cache system 400 responsive to a large amount of I/O requests. In some implementations, if the control module 410 determines that the type of the received pending processing I/O request is different from any types of I/O requests for which the pipeline module 420 is provided, other suitable components in the cache system 400 can be utilized to process the particular I/O requests.

Figure 6:
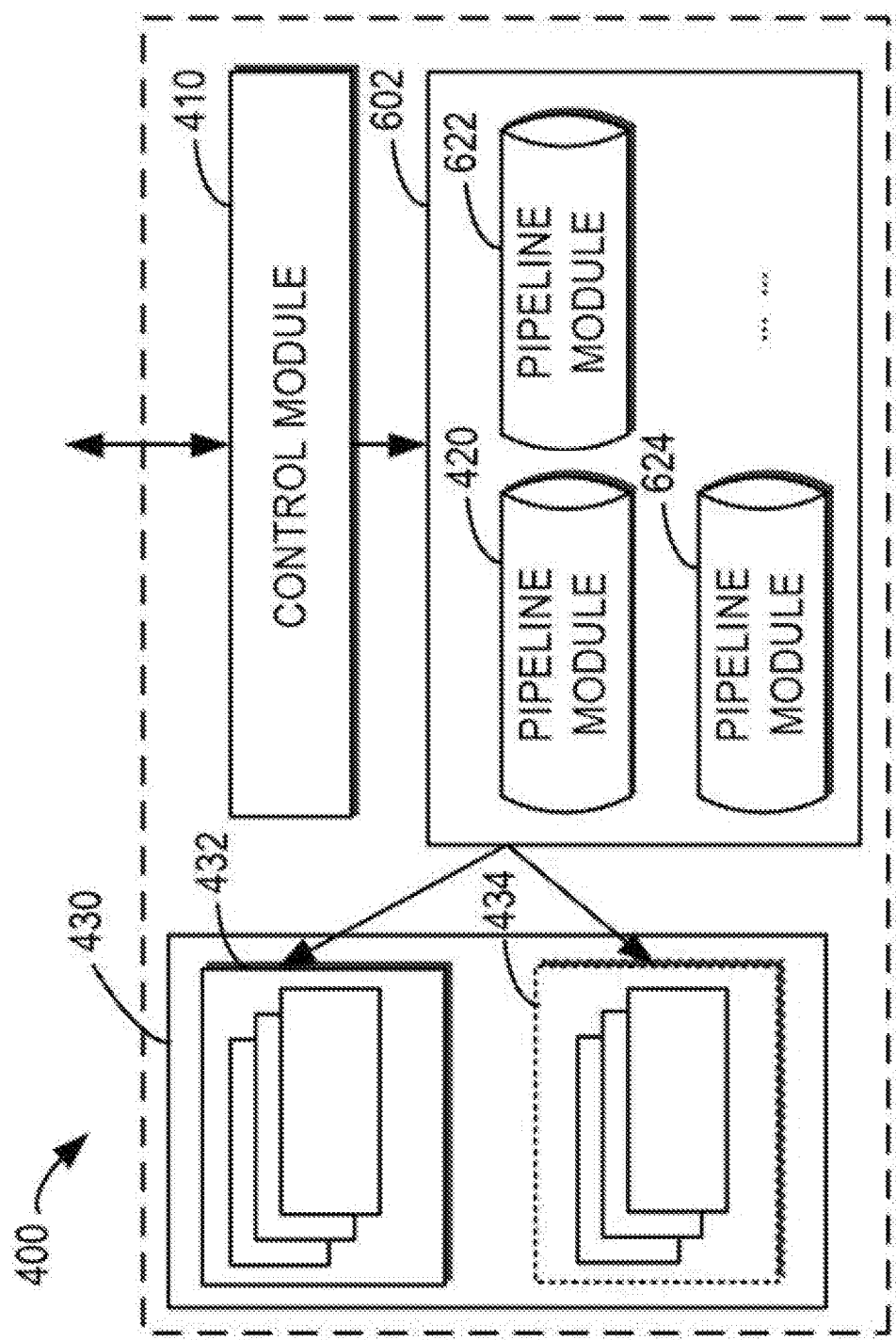
FIG. 6 illustrates a structural block diagram of a cache system in accordance with a further embodiment of the present disclosure.

In some other embodiments, the cache system 400 may include two or more pipeline modules and each of the pipeline modules may include a plurality of sequential processing phases, where each processing phase may execute one of a plurality of operations. FIG. 6 illustrates an example of such cache system. The cache system of FIG. 6 may be regarded as a specific example of the cache system of FIG. 4. As shown in FIG. 6, in addition to the pipeline module 420, the cache system 400 further includes other pipeline modules 622 and 624 and the like. These pipeline modules may form a pipeline processing portion 602 of the cache system 400, and each of the pipeline modules may process the corresponding I/O requests in a pipeline fashion.

In some embodiments, the operations executed by the sequential processing phases of one or more pipeline modules in the pipeline processing portion 602 may include the operations executed by the cache system 400 in response to I/O requests of a single type for the persistent storage device. That is, a corresponding pipeline module may be configured for the I/O requests of a single type for executing the operations. Alternatively, or in addition, one or more pipeline modules in the pipeline processing portion 602 may be pipeline modules configured for backend processing for I/O requests of one or more types. The setting process for each pipeline module in the pipeline processing portion 602 may be similar to the process for the pipeline module 420 as discussed above, and it is required to set only the operational process for I/O requests of each corresponding type. For the pipeline module related to the backend processing, the backend processing process associated with the I/O requests of the corresponding type can be set. In some embodiments, it is also impossible that more than two pipeline modules are configured for one or more certain types of I/O requests.

During the operation, upon receiving a pending processing I/O request, the control module 410 may determine that the type of the pending processing I/O request is the same as the type of I/O requests of which pipeline module in the pipeline module processing portion 602, and then schedule that pipeline module having the same type to execute the I/O request. The operations of the plurality of pipeline modules are parallel. That is, even if one pipeline module is executing the operations of one or more I/O requests, the control module 410 may also cause other pipeline modules to be executed to process one or more other I/O requests. By setting a plurality of pipeline modules, it is possible to avoid the congestion resulted from the problems such as resource conflicts and the like within a single pipeline module, such that the cache system 400 is more suitable for quickly processing more I/O requests with the reduced response time and enhanced performance.

In some embodiments, some processing phases in the plurality of pipeline modules of the pipeline processing portion 602 are all allocated with the cache resource 430 of the cache system 400. Due to the limitation of the cache resources 430, it is expected that the cache resources can be prioritized to be allocated to the pipeline module with a higher priority when all of the plurality of processing phases are contending the cache resources. The priorities of the pipeline modules may be associated with the types of I/O requests they are able to execute. In some examples, a pipeline module that can process I/O requests with a high latency requirement may be allocated with a relatively higher priority, and a pipeline module that processes I/O requests having a low latency requirement may be allocated with a relatively lower priority. In addition to the latency requirement of the I/O requests or as an alternative, the priorities of the pipeline modules may also be determined based on other factors such as the complexity of the processing phases in the corresponding pipeline module and the like. For example, the real-time read or write requests from the client usually have a high latency requirement, and thus the pipeline module for processing these types of I/O requests may be allocated with a high priority. For the zero-fill requests, for example, they are often not issued by the client for real-time reading and writing, and thus the pipeline module for processing this type of I/O requests may be allocated with a low priority.

During the operation, the control module 410 may execute allocation of the cache resources 430 for the plurality of pipeline modules according to the respective priorities of the pipeline modules. For example, if multiple processing phases in two or more pipeline modules all require the cache resources 430 for execution, in the case of limited available cache resource 430, the control module 410 may first allocate some available cache resources 430 to the processing phases of one or more pipeline modules with a relatively high priority.

The cache system of the example embodiments of the present disclosure has been discussed above with reference to some drawings. It would be appreciated that the pipeline module and the control module in the cache system may be implemented by software program modules, hardware, and/ or a combination of software and hardware. The control module in the cache system controls and manages operations, scheduling, and resource allocations of the pipeline modules. In some implementations, the control module may be partially or fully implemented in form of a state machine. In some implementations, the control module may be implemented as modules having capability of control and management, such as a controller, microcontroller, microprocessor, and the like.

Although a single cache system has been discussed above, in some implementations, two or more cache systems may be provided between a client and a persistent storage device, each being used for caching mirror of cached data for one another. The cache systems may be connected via an interface such as the PCIe interface.

Figure 7:
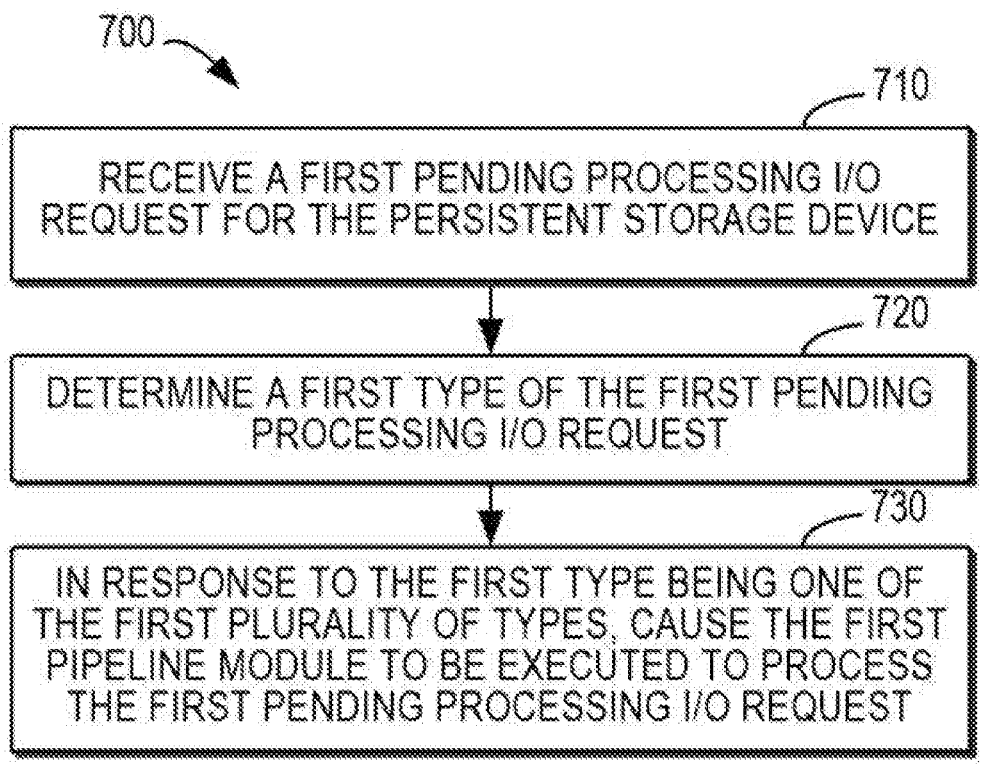
FIG. 7 illustrates a flowchart of a process for a cache systemin in accordance with an embodiment of the present disclosure.

FIG. 7 illustrates a flowchart of a process 700 for a cache system in accordance with an embodiment. The process 700 may be implemented by the cache system 400, such as the control module 410 of the cache system 400. For the purpose of illustration, the process 700 will be described with reference to FIGS. 4 and 6.

At 710, the cache system 400 receives a first pending processing Input/Output (I/O) request for the persistent storage device. The cache system 400 includes a first pipeline module 420 having a first plurality of sequential processing phases for executing a first plurality of operations. The first plurality of operations are executed in response to I/O requests of a first plurality of types for the persistent storage device, and each of the first plurality of operations is a common operation for I/O requests of at least two of the first plurality of types. At 720, the cache system 400 determines a first type of a first pending processing I/O request. Then at 730, the cache system 400 causes, in response to the first type being one of the first plurality of types, the first pipeline module 420 to be executed to process the first pending processing I/O request.

In some embodiments, the first plurality of operations may include at least at least one operation associated with access to the persistent storage device.

In some embodiments, the I/O requests of the first plurality of types may include more than one of the following: a read request, a write request, a zero-fill request, a pre-fetch request, and a data removal request.

In some embodiments, the process 700 may further include: receiving a second pending processing I/O request for the persistent storage device; determining a second type of the second pending processing I/O request; and in response to determining that the second type is one of the first plurality of types, while a first one of the first plurality of sequential processing phases is executing, causing the first pipeline module to be executed to process the second pending processing I/O request using a second sequential processing phase prior to the first sequential processing phase.

In some embodiments, causing the first pipeline module 420 to be executed may include: selecting at least one of the first plurality of processing phases for the first pending processing I/O request; causing the at least one selected processing phase to be executed for the first pending processing I/O request; and causing other processing phases in the first plurality of processing phases to be skipped.

In some embodiments, causing the first pipeline module 420 to be executed by the cache system includes: in response to cache resources available for a third one of the first plurality of sequential processing phases in the cache system being below a predetermined threshold, suspending execution of the third sequential processing phase for a predetermined period of time; and in response to the cache resources exceeding the predetermined threshold, causing the third sequential processing phase to be executed.

In some embodiments, the cache system 400 may further include a second pipeline module 622 or 624. The second pipeline module 622 or 624 has a second plurality of sequential processing phases for executing a second plurality of operations, the second plurality of operations being executed in response to an I/O request of a third type for the persistent storage device. The process 700 may further include: receiving a third pending processing I/O request for the persistent storage device; determining a type of the third pending processing I/O request; and in response to the determined type being the third type, causing the second pipeline module 622 or 624 to be executed to process the third pending processing I/O request.

In some embodiments, causing the second pipeline module 622 or 624 to be executed may include: causing the second pipeline module 622 or 624 to be executed while the first pipeline module 420 is executing the first pending processing I/O request.

In some embodiments, the process 700 further includes: allocating cache resource of the cache system 400 for the first pipeline module 420 and the second pipeline module 622 or 624 based on respective priorities of the first pipeline module 420 and the second pipeline module 622 or 624.

Those skilled in the art would understand that various steps of the method of the disclosure above may be implemented via a general purpose computing device, which may be integrated on a single computing device or distributed over a network composed of a plurality of computing devices. Optionally, they may be implemented using program code executable by the computing device, such that they may be stored in a storage device and executed by the computing device; or they may be made into respective integrated circuit modules or a plurality of modules or steps therein may be made into a single integrated circuit module for implementation. In this way, the present disclosure is not limited to any specific combination of hardware and software.

It would be appreciated that although several means or sub-means of the apparatus have been mentioned in detailed description above, such partition is only example but not limitation. Actually, according to the embodiments of the present disclosure, features and functions of two or more apparatuses described above may be instantiated in one apparatus. In turn, features and functions of one apparatus described above may be further partitioned to be instantiated by various apparatuses.

What have been mentioned above are only some optional embodiments of the present disclosure and are not limiting the present disclosure. For those skilled in the art, the present disclosure may have various alternations and changes. Any modifications, equivalents and improvements made within the spirits and principles of the present disclosure should be included within the scope of the present disclosure.

We claim:

1. A cache system, the cache system providing read and/or write caching for a persistent storage device and comprising:
   a first pipeline module including a first plurality of sequential processing phases for executing a first plurality of operations, the first plurality of operations being executed in response to Input/Output (I/O) requests of a first plurality of types for the persistent storage device, and each of the first plurality of operations being a common operation for the I/O requests of at least two of the first plurality of types; and a control module configured to:
determine a first type of a first pending processing I/O request for the persistent storage device, and
in response to the first type being one of the first plurality of types, cause the first pipeline module to be executed to process the first pending processing I/O request,
wherein the first plurality of operation include at least one operation that involves access to the persistent storage device.

2. The cache system of claim 1, wherein the I/O requests of the first plurality of types include more than one of the following: a read request, a write request, a zero-fill request, a pre-fetch request, and a data removal request.

3. The cache system of claim 1, wherein the control module is further configured to:
determine a second type of a second pending processing I/O request for the persistent storage device; and
in response to determining that the second type is one of the first plurality of types, while a first one of the first plurality of sequential processing phases is executing, cause the first pipeline module to be executed to process the second pending processing I/O request using a second sequential processing phase prior to the first sequential processing phase in the first plurality of sequential processing phases.

4. The cache system of claim 1, wherein the control module is configured to:
select at least one of the first plurality of processing phases for the first pending processing I/O request;
cause the at least one selected processing phase to be executed for the first pending processing I/O request; and
cause other processing phases in the first plurality of processing phases to be skipped.

5. The cache system of claim 1, wherein a third one of the first plurality of sequential processing phases is operable to be suspended for a predetermined period of time in response to cache resources available for the third sequential processing phase in the cache system being below a predetermined threshold, and to be executed in response to the cache resource exceeding the predetermined threshold.

6. The cache system of claim 1, further comprising:
a second pipeline module including a second plurality of sequential processing phases for executing a second plurality of operations, the second plurality of operations being executed in response to an I/O request of a third type for the persistent storage device, and
wherein the control module is further configured to:
determine a type of a third pending processing I/O request received by the cache system, and
in response to the determined type being the third type, cause the second pipeline module to be executed to process the third pending processing I/O request.

7. The cache system of claim 6, wherein the control module is further configured to:
cause the second pipeline module to be executed while the first pipeline module is executing the first pending processing I/O request.

8. The cache system of claim 7, wherein the control module is further configured to:
allocate cache resources of the cache system for the first and second pipeline modules based on respective priorities of the first and second pipeline modules.

9. A method for a cache system providing read and/or write caching for a persistent storage device, the method comprising:
receiving a first pending processing Input/Output (I/O) request for the persistent storage device, the cache system including a first pipeline module having a first plurality of sequential processing phases for executing a first plurality of operations, the first plurality of operations being executed in response to I/O requests of a first plurality of types for the persistent storage device, and each of the first plurality of operations being a common operation for the I/O requests of at least two of the first plurality of types;
determining a first type of a first pending processing I/O request; and
in response to the first type being one of the first plurality of types, causing the first pipeline module to be executed to process the first pending processing I/O request,
wherein the I/O requests of the first plurality of types include more than one of the following: a read request, a write request, a zero-fill request, a pre-fetch request, and a data removal request.

10. The method of claim 9, wherein the first plurality of operations include at least at least one operation associated with access to the persistent storage device.

11. The method of claim 9, further comprising:
receiving a second pending processing I/O request for the persistent storage device;
determining a second type of the second pending processing I/O request; and
in response to determining that the second type is one of the first plurality of types, while a first one of the first plurality of sequential processing phases is executing, causing the first pipeline module to be executed to process the second pending processing I/O request using a second sequential processing phase prior to the first sequential processing phase in the first plurality of sequential processing phases.

12. The method of claim 9, wherein causing the first pipeline module to be executed comprises:
selecting at least one of the first plurality of processing phases for the first pending processing I/O request;
causing the at least one selected processing phase to be executed for the first pending processing I/O request; and
causing other processing phases in the first plurality of processing phases to be skipped.

13. The method of claim 9, wherein causing the first pipeline module to be executed comprises:
in response to cache resources available for a third one of the first plurality of sequential processing phases in the cache system being below a predetermined threshold, suspending execution of the third sequential processing phase for a predetermined period of time; and
in response to the cache resources exceeding the predetermined threshold, causing the third sequential processing phase to be executed.

14. The method of claim 9, wherein the cache system further includes a second pipeline module having a second plurality of sequential processing phases for executing a second plurality of operations, the second plurality of operations being executed in response to an I/O request of a third type for the persistent storage device, and wherein the method further comprises:
  receiving a third pending processing I/O request for the persistent storage device,
  determining a type of the third pending processing I/O request, and
  in response to the determined type being the third type, causing the second pipeline module to be executed to process the third pending processing I/O request.

15. The method of claim 14, wherein causing the second pipeline module to be executed comprises:
  causing the second pipeline module to be executed while the first pipeline module is executing the first pending processing I/O request.

16. The method of claim 15, further comprising:
  allocating cache resources of the cache system for the first and second pipeline modules based on respective priorities of the first pipeline and second pipeline modules.

17. A computer program product for a cache system providing read and/or write caching for a persistent storage device, the computer program product comprising:
  a non-transitory computer readable medium encoded with computer-executable program code, the code configured to enable the execution of:
    receiving a first pending processing Input/Output (I/O) request for the persistent storage device, the cache system including a first pipeline module having a first plurality of sequential processing phases for executing a first plurality of operations, the first plurality of operations being executed in response to I/O requests of a first plurality of types for the persistent storage device, and each of the first plurality of operations being a common operation for the I/O requests of at least two of the first plurality of types;
    determining a first type of a first pending processing I/O request; and
    in response to the first type being one of the first plurality of types, causing the first pipeline module to be executed to process the first pending processing I/O request,
    wherein the first plurality of operations include at least one operation associated with access to the persistent storage device.

* * * * *